(12) United States Patent
Castillo et al.

(10) Patent No.: US 11,725,133 B2
(45) Date of Patent: Aug. 15, 2023

(54) FLUID SYSTEMS FOR EXPANDING SHAPE MEMORY POLYMERS AND REMOVING FILTER CAKES

(71) Applicants: Dorianne A. Castillo, Humble, TX (US); Autumn Shepherd, Katy, TX (US); Ajay Kumar Venkata Addagalla, Guntur (IN)

(72) Inventors: Dorianne A. Castillo, Humble, TX (US); Autumn Shepherd, Katy, TX (US); Ajay Kumar Venkata Addagalla, Guntur (IN)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 17/510,721

(22) Filed: Oct. 26, 2021

(65) Prior Publication Data
US 2023/0052268 A1 Feb. 16, 2023

Related U.S. Application Data

(60) Provisional application No. 63/227,081, filed on Jul. 29, 2021.

(51) Int. Cl.
*E21B 33/12* (2006.01)
*C09K 8/528* (2006.01)
(Continued)

(52) U.S. Cl.
CPC .............. *C09K 8/528* (2013.01); *C09K 8/54* (2013.01); *E21B 33/1208* (2013.01);
(Continued)

(58) Field of Classification Search
CPC .... C09K 8/528; C09K 8/524; C09K 2208/32; E21B 336/1208; E21B 37/00; E21B 41/02
See application file for complete search history.

(56) References Cited

U.S. PATENT DOCUMENTS 9,051,805 B2 6/2015 Johnson et al.
9,097,108 B2 8/2015 Johnson et al.
(Continued)

FOREIGN PATENT DOCUMENTS

WO 2013160334 A1 10/2013

OTHER PUBLICATIONS

Addagalla, A., et al. "Novel Dual Function Surfactant Package Helps Shaped-Memory Polymer to Activate and Remediate the Filter Cake in Open Hole Completions", IPTC-19515-MS, 2019, 13 pages.
(Continued)

*Primary Examiner* — Silvana C Runyan
(74) *Attorney, Agent, or Firm* — Cantor Colburn LLP

(57) ABSTRACT

A method includes disposing a device into a borehole in proximity to a subterranean formation where a filter cake has been formed adjacent thereto, the device comprising a support structure and a shape-memory article disposed at the support structure, the shape-memory article comprising a shape-memory polymer, wherein the device is disposed when the shape-memory article is in a compacted shape; exposing the shape-memory article to a fluid system to cause the shape-memory article to expand and conform to a surface of the borehole; exposing the filter cake to the fluid system; and removing the filter cake with the fluid system. The fluid system comprises (i) an acid component, a chelating agent, or a combination thereof; (ii) an activator, (iii) a viscosifier, (iv) water or a brine, and (v) optionally a surfactant.

22 Claims, 6 Drawing Sheets

(51) Int. Cl.
  *C09K 8/54*    (2006.01)
  *E21B 37/00*   (2006.01)
  *E21B 41/02*   (2006.01)

(52) U.S. Cl.
  CPC .......... *E21B 37/00* (2013.01); *C09K 2208/32* (2013.01); *E21B 41/02* (2013.01)

(56) References Cited

U.S. PATENT DOCUMENTS

| | | |
|---|---|---|
| 9,441,458 B2 | 9/2016 | Carrejo et al. |
| 9,725,990 B2 | 8/2017 | Johnson et al. |
| 2008/0076682 A1* | 3/2008 | Jones ...................... C09K 8/36 507/131 |
| 2010/0216672 A1 | 8/2010 | Todd |
| 2011/0005773 A1* | 1/2011 | Dusterhoft ............... C09K 8/52 166/376 |
| 2012/0190593 A1 | 7/2012 | Soane et al. |
| 2013/0161026 A1 | 6/2013 | Garza et al. |
| 2014/0020910 A1 | 1/2014 | Falkner et al. |
| 2014/0318788 A1 | 10/2014 | Agrawal et al. |
| 2014/0332220 A1 | 11/2014 | Garza et al. |
| 2017/0081585 A1* | 3/2017 | Bestaoui-Spurr ...... C09K 8/508 |
| 2018/0037803 A1* | 2/2018 | Dahi Taleghani .... E21B 43/267 |
| 2019/0016947 A1* | 1/2019 | Mahmoud .............. C09K 8/524 |

OTHER PUBLICATIONS

International Search Report and Written Opinion for International Application No. PCT/US2022/037543, International Filing Date Jul. 19, 2022, dated Nov. 4, 2022, 8 pages.

* cited by examiner

FLUID SYSTEMS FOR EXPANDING SHAPE MEMORY POLYMERS AND REMOVING FILTER CAKES

CROSS REFERENCE TO RELATED APPLICATIONS

This application claims the benefit of an earlier filing date from U.S. Provisional Application Ser. No. 63/227,081 filed Jul. 29, 2021, the entire disclosure of which is incorporated herein by reference.

BACKGROUND

Shape-memory polymers (SMPs) are materials that regain their original shape from a deformed state when induced by an external stimulus, such as temperature change. Shape-memory polymers are useful for a variety of downhole applications, particularly those that require the sealing off a portion of a borehole or constricting the spacing around an element. Shape-memory polymers can also be used in sand control applications.

Articles can be formed from shape-memory polymers by heating and shaping the polymers at a temperature above their glass transition temperature, then subsequently fixing the shape by cooling to below the glass transition temperature.

During deployment, the shaped articles are heated above the glass transition temperature or slightly below the glass transition temperature to allow recovery of the original shape of the articles. In addition to temperature change, the shape memory effect can also be triggered by an electric or magnetic field, light, contact with a particular fluid or a change in pH.

Other than deploying shaped articles, drilling and completing a well prior to production may require many other steps or numerous trips of a drill string prior to production. It would thus be desirable to combine the deployment of shape-memory articles with other operations to reduce the number of trips into and out of the wellbore or to improve the efficiency of the drilling and completion operations.

BRIEF DESCRIPTION

A method includes disposing a device into a borehole in proximity to a subterranean formation where a filter cake has been formed adjacent thereto, the device comprising a support structure and a shape-memory article disposed at the support structure, the shape-memory article comprising a shape-memory polymer, wherein the device is disposed when the shape-memory article is in a compacted shape; exposing the shape-memory article to a fluid system to cause the shape-memory article to expand and conform to a surface of the borehole; exposing the filter cake to the fluid system; and removing the filter cake with the fluid system. The fluid system comprises (i) an acid component, a chelating agent, or a combination thereof; (ii) an activator, (iii) a viscosifier, (iv) water or a brine, and (v) optionally a surfactant.

A fluid system comprises, based on the total weight of the fluid system, (i) about 1 to 25 wt. % of an acid component, or about 3 to 30 wt. % of a chelating agent, or a combination thereof; (ii) about 1 to 20 wt. % of an activator; (iii) about 0.1 to 3 wt. % of a viscosifier; (iv) about 30 to 90 wt. % of a brine; (v) about 5 to 30 wt. % of a surfactant; (vi) about 1 to 20 wt. % of a co-solvent; and (vii) about 1 to 3 wt. % of a corrosion inhibitor.

BRIEF DESCRIPTION OF THE DRAWINGS

The following description should not be considered limiting in any way. With reference to the accompanying drawings, like elements are numbered alike.

DETAILED DESCRIPTION

Figure 1:
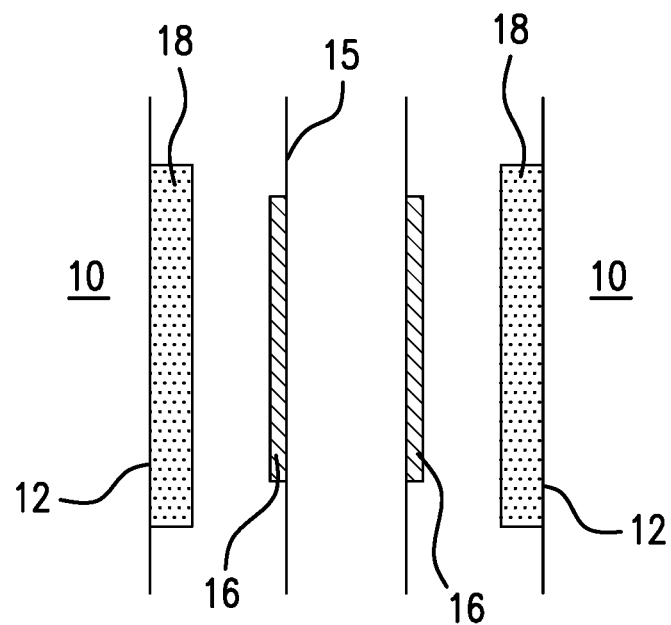
FIG. 1 is a schematic illustration of a device bearing a shape-memory article positioned in proximity to a subterranean formation having a filter cake formed adjacent thereto.

A filter cake is the residue deposited adjacent to a subterranean formation, when a slurry, such as a drilling fluid, a drill-in fluid, or a servicing fluid, is forced against a wellbore or subterranean formation under pressure. If a filter cake is not removed prior to or during completion of the well, a range of issues, such as completion equipment failures or impaired reservoir productivity, can arise when the well is put on production.

The inventors have developed a single fluid system that has the dual function of expanding shape-memory articles and removing filter cakes. Advantageously filter cakes can be removed after the shape-memory articles are deployed or fully expanded.

Carrier fluids have been used to expand shape-memory articles. However, known carrier fluids can have a relatively low flash point and do not allow for a complete and/or delayed filter cake removal.

Acids can be used to remove filter cakes. However, breaker compositions that contain just the acids can break a filter cake too fast such that the shape-memory articles are not fully expanded or deployed before the filter cake is removed.

The dual-function fluid systems disclosed herein are effective to remove filter cakes after the shape-memory articles are fully expanded. The fluid systems contain (i) an acid component, or a chelating agent, or a combination thereof; (ii) an activator; (iii) a viscosifier; (iv) water or a brine; and optionally (v) at least one of a surfactant, a corrosion inhibitor, or a co-solvent.

The acid component can include an acid, an acid precursor, or a combination thereof. The acids can be an inorganic acids including but are not limited to HCl, $H_2SO_4$, HF, $HNO_3$; binary acids or carboxylic acids including but are not limited to acetic acid, formic acid, lactic acid, citric acid, phthalic acid; or amino acids such as glutamic acid. Acid precursors include esters of acetic acid, formic acid, lactic acid, or citric acid. Combinations of the acids and/or acid precursors can be used. As used herein, the acid component refers to an acid or acid precursor that does not form coordinate bonds with a metal.

Examples of the chelating agents include, but are not limited to, ethyienediaminetetraacetic acid (EDTA) or a salt thereof such as sodium EDTA and disodium EDTA, trisodium N-(hydroxyethyl)-ethylenediaminetriacetate, pentasodium diethylene-triaminepentaacetate, (N,N-dicarboxymethyl glutamic) acid (GLDA), aspartic acid N,N-diacetic acid (ASDA), methylglycine N,N-diacetic acid (MGDA), N-hydroxyethyl ethylenediamine N,N',N'-triacetic acid or a salt thereof (HEDTA), etidronic acid (also referred to has 1-hydroxyethane-1,1-diphosphonic acid or HEDP), diethylenetriamine pentaacetateor (DTPA), hydroxyethylethylenediaminetriacetic acid (HEDTA), N-(2-Hydroxyethyl)iminodiacetic acid (HEIDA), trisodium dicarboxymethyl alaninate (MGDA), ethylenediamine-N,N'-disuccinic acid (EDDS), egtazic acid (EGTA), nitrilotriacetic acid (NTA), cyclohexanediaminetetraacetic acid (CDTA), a salt of the acids, or a combination comprising at least one of the foregoing.

As used herein, activators are materials that are effective to reduce the glass transition temperature and/or rigidity of shape-memory polymers. Activators are normally liquids at room temperature. Certain known activators can have a low flash point and pose environmental concerns. Such activators can also be difficult to handle, particularly if used in large amounts. The activators used in the fluid systems disclosed herein have a higher flash point, and avoid any potential volatiles associated with certain activation agents. The activators used in the fluid systems described herein can have a flash point of greater than about 125° F.

Examples of the activator that can be used in the fluid systems include but are not limited to butanol, butoxy tri-glycol, 2-butoxyethanol, acetyl acetone, adipate, or maleate. Other alcohols, glycols, ethoxylated alcohols, ethoxylated glycols, ethoxylated phenols, propoxylated alcohols, propoxylated glycols, propoxylated phenols, ethoxylated and propoxylated alcohols, ethoxylated and propoxylated glycols, ethoxylated and propoxylated phenols, n-butyl acetate, n-butyl propionate, n-propyl propionate, n-pentyl propionate, diethylene glycol, mono ethyl ether acetate, or triethylene glycol n-butyl may also be used. The ethoxylated and/or propoxylated alcohols can have a structure represented by the Formula $R—(OCH_2CH_2)_m(OCH_2CH_2Ch_2)_n—OH$, wherein R is a $C_{1-7}$ alkyl, $C_{1-5}$ alkyl, $C_{1-3}$ alkyl, or ethyl, m is 0 to 8, and n is 0 to 8, provided that the sum of m and is at least 1. Combinations of two or more activators can be used.

A viscosifier is a component that increases the viscosity of the fluid systems. Examples of viscosifiers include but are not limited to hydratable polysaccharides, xanthan gum (which may or may not be crosslinked), cellulose, cellulose derivatives such as hydroxyethylcellulose (HEC); carboxymethylcellulose (CMC); hydroxypropylcellulose (HPC); and carboxymethylhydroxyethylcellulose (CMHEC), viscoelastic surfactants, or synthetic polymers such as polyacrylamides, polyacrylates, or diallyldimethylammonium chloride. A combination of two or more viscosifiers can be used.

The brine can include unsaturated up to saturated Ca, Na, K, Cs, or Zn halides or formate brine. Examples of the salts suitable for use in creating the brine include, sodium chloride, potassium chloride, calcium chloride, sodium bromide, calcium bromide, zinc bromide, sodium formate, potassium formate, cesium formate, or a combination comprising two or more of the foregoing salts. The density of the brine may range from about 8.4 pounds/gallon (lb/gal or ppg) to about 17 lb/gal (about 1 to about 2 kg/liter), about 8.4 lb/gal to about 14 lb/gal, about 8.4 lb/gal to about 12 lb/gal, or about 8.4 lb/gal to about 11 lb/gal.

The fluid systems can also include at least one surfactant such as a non-ionic surfactant, an anionic surfactants, a cationic surfactant, or an amphoteric surfactant.

Examples of nonionic surfactants include alkyl polyglycosides, sorbitan esters, polyglycol esters, methyl glucoside esters, alcohol ethoxylates, or surfactin. Alcohol ethoxylates are also referred to as alkyl ethoxylates, which are condensation products of aliphatic alcohols with from about 0 to about 25 moles of ethylene oxide. The alkyl chain of the aliphatic alcohol can either be straight or branched, primary or secondary, and generally contains from about 6 to about 22 carbon atoms.

The anionic surfactants include alkali metal alkyl sulfates, alkyl or alkylaryl sulfonates, linear or branched alkyl ether sulfates and sulfonates, alcohol polypropoxylated and/or polyethoxylated sulfates, alcohol polypropoxylated and/or polyethoxylated carboxylates, alkyl or alkylaryl disulfonates, alkyl disulfates, sulfobetaines, alkyl sulphosuccinates, alkyl ether sulfates, linear and branched ether sulfates, or combinations comprising at least one of the foregoing.

In some embodiments, the anionic sulfonate, sulfate, and carboxylated surfactants have a hydrophobic chain of about 4 to about 40 carbon atoms, about 15 to about 30 carbon atoms, or about 20 to 25 carbon atoms. The anionic sulfonate surfactants can comprise an internal olefin or alcohol alkoxy sulfate. By "an internal olefin" is meant the molecule comprises an equilibrium mixture of double bonded isomers. Exemplary specific anionic sulfonate, sulfate, and carboxylated surfactants include, but are not necessarily limited to, internal olefin sulfonates, alcohol alkoxy sulfates, alcohol ethoxylated sulfates, alcohol propoxylated-ethoxylated sulfates, alkane sulfonates, alcohol propoxylated-ethoxylated sulfonated, alcohol polypropoxylated-ethoxylated carboxylated, alcohol ethoxylated carboxylated, and alcohol ethoxylated sulfonated.

Examples of cationic surfactants include quaternary ammonium compounds (e.g. polyglycol ether ammonium methyl chloride), arginine methyl esters, alkanolamines, alkylenediamines, or a combination comprising two or more of the foregoing cationic surfactants.

The fluid systems can also contain a corrosion inhibitor such as an organic, inorganic, anodic or cathodic acid inhibitor. The corrosion inhibitor serves to reduce or prevent the corrosion of metal or metal-containing equipment. Examples of the corrosion inhibitor include quaternary ammonium compounds, sulfur compounds, isopropanol, methanol, alcohols ethoxylated, thiourea, formaldehyde, 1-phenylethanone, thio-alcohols, alkylpyridine benzyl chloride quaternary, oxyalkylated fatty alcohol, ethoxylated tall oil, acetophenone, aldehydes, or phosphates.

Optionally the fluid systems contain a co-solvent such as glycol ether, an aliphatic alcohol, or a combination thereof.

In an embodiment, the fluid systems comprise about (i) (ia) 1 to 25 wt %, about 5 to about 20 wt. %, about 5 to about 15 wt %, about 8 to 12 wt %, or about 10 wt % of the acid component, or (ib) about 3 to about 30 wt %, about 5 to about 30 wt % of the chelating agent, or (ic) a combination of (ia) and (ib); (ii) about 1 to 20 wt %, about 1 to about 15 wt %, about 1 to about 10 wt %, about 3 to about 10 wt %, or about 5 wt % of the activator; (iii) about 0.1 to 3 wt % or about 0.5 to 2 wt % of the viscosifier; and (iv) about 30 to 90 wt %, about 40 to 80 wt %, or about 50 to 70 wt % of the water or brine, each based on the total weight of the fluid systems.

Optionally the fluid systems further comprise about 5 to 30 wt %, about 10 to 30 wt %, about 15 to about 30 wt %, or about 20 to 25 wt % of at least one surfactant based on the total weight of the fluid systems. The fluid systems can also contain about 1 to 3 wt % of the corrosion inhibitor, and/or about 1 to 20 wt % of the co-solvent, each based on the total weight of the fluid systems.

Optionally the fluid systems are microemulsions. A microemulsion is a single optically isotropic and thermodynamically stable liquid solution.

The components of the fluid system can be combined to form a fluid system. Combining the components of the fluid systems can be accomplished in a vessel such as a mixer, blender, and the like. In some embodiments, fluid systems are injected without mixing, e.g. it is injected "on the fly."

The fluid systems can be used to expand shape-memory articles. Shape-memory articles comprise shape-memory polymers such as polyurethanes, polyamides, polyureas, polyvinyl alcohols, vinyl alcohol-vinyl ester copolymers, phenolic polymers, polybenzimidazoles, polyethylene oxide/acrylic acid/methacrylic acid copolymer crosslinked with N,N'-methylene-bis-acrylamide, polyethylene oxide/methacrylic acid/N-vinyl-2-pyrrolidone copolymer crosslinked with ethylene glycol dimethacrylate, polyethylene oxide/poly(methyl methacrylate)/N-vinyl-2-pyrrolidone copolymer crosslinked with ethylene glycol dimethacrylate, or a combination comprising at least one of the foregoing polymers. The shape-memory articles can be a foam. For sand control applications, the shape-memory articles are open cell foams. Bulk shape memory polymer can also be used.

In an embodiment, the shape-memory article is a polyurethane foam. The polyurethane foam is extremely tough and strong and is capable of being compressed and returned to substantially its original non-compressed shape. The polyurethane foam material can be made from one or more polyol components, such as, but not limited to, a polyether, polyester or polycarbonate-based di- or multifunctional hydroxylended prepolymer or polyol, and at least one isocyanate component, including, for example, a modified isocyanate (MI) or a modified diphenylmethane diisocyanate (MDI) based monomeric diisocyanate or polyisocyanate, as well as other additives such as blowing agents, molecular cross linkers, chain extenders, surfactants, colorants and catalysts.

The shape-memory polymers are able to remain in the deformed state even after applied mechanical force is removed, provided that the shape-memory polymers are not heated to a temperature above its glass transition temperature or slightly below its glass transition temperature. Accordingly, in an embodiment, the shape-memory polymers have a glass transition temperature that is about 20° C. or about 30° C. higher than the actual downhole deployment/application temperature to avoid premature expansion during run-in.

Shape-memory articles can be deployed or fully expanded in about 2 hours to about 40 hours, about 3 hours to about 30 hours, about 5 to 20 hours, or about 8 to 16 hours when the shape-memory articles are exposed to the fluid systems as described herein at a temperature of about 100 to 200° F. As used herein, "deployed" or "fully expanded" means that a shape-memory article returns to its original, manufactured shape or pre-deformed shape, or if constrained, the shape-memory article conforms to the new constrained shape. In an embodiment, a fully expanded or deployed shape-memory article means that the article has expanded and conformed to a surface of the borehole.

Advantageously, the fluid systems disclosed herein can remove filter cakes after the shape-memory articles are fully expanded. For example, filter cakes can be removed at least two hours or at least four hours after the shape-memory articles have expanded and conformed to the surface of a borehole.

As used herein, a filter cake can be a filter cake formed from well drill-in fluids, drilling fluids, and servicing fluids. In an embodiment, the filter cake is formed from oil-based mud or a synthetic-based mud.

The oil-based muds (OBM) comprise a non-aqueous fluid (oil or oil base) as the predominant component of the liquid phase. OBM can be invert emulsions composed of oil as the continuous phase and water or brine as the dispersed phase. Examples of the oil base for OBM include diesel oil, kerosene oil, mineral oil, fuel oil, crude oil, paraffin oil, vegetable oil such as soybean oil and palm oil, gas oil, synthetic oil such as polyolefins (e.g., alpha-olefins and/or internal olefins), polydiorganosiloxanes, esters, diesters of carbonic acid, aliphatic solvents, aromatic solvents, or combinations thereof. OBM can also include emulsifiers, wetting agents, gellants, viscosifiers, weighting agents, and/or other additives.

The term "synthetic-based mud" or SBM describes any oil-based mud that has a synthetic liquid base. In other words, SBMs use a synthetic oil rather than a natural hydrocarbon as the base fluid. Some common synthetic base fluids include linear alphaolefins, straight internal olefins, polyalphaolefins, vegetable oils, esters, and ethers. An example of a base fluid for a SBM is palm oil.

Filter cakes can be formed adjacent a subterranean formation, for example, within a borehole, on a borehole wall, on a surface of a subterranean formation, or within a subterranean formation.

The fluid system can remove filter cakes in about 8 hours to about 60 hours, about 10 hours to about 50 hours, or about 16 to about 42 hours at a temperature of about 100 to 200° F. or about 130 to 175° F. After the filter cake is removed, the return production permeability is greater than 80% or greater than 90%.

Figure 2:
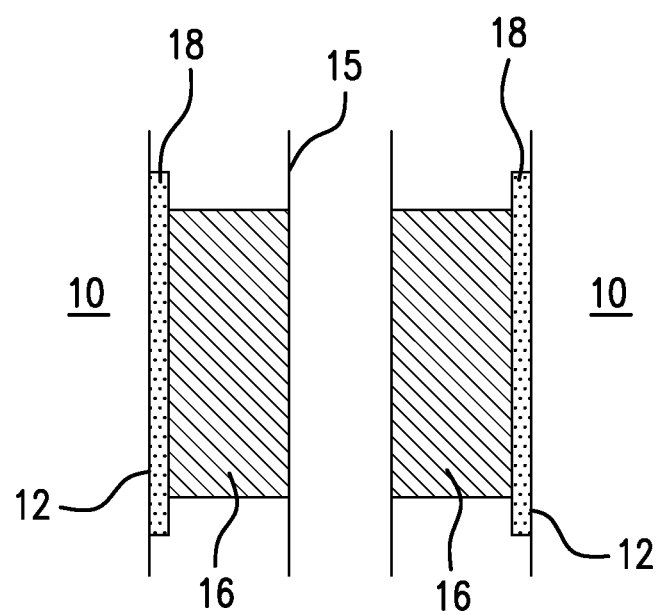
FIG. 2 is a schematic illustration of the device shown in FIG. 1 after the shape-memory article and the filter cake are exposed to a fluid system for a period of time to cause the shape-memory article to expand and conform to a surface of a borehole, and to partially remove the filter cake.
Figure 3:
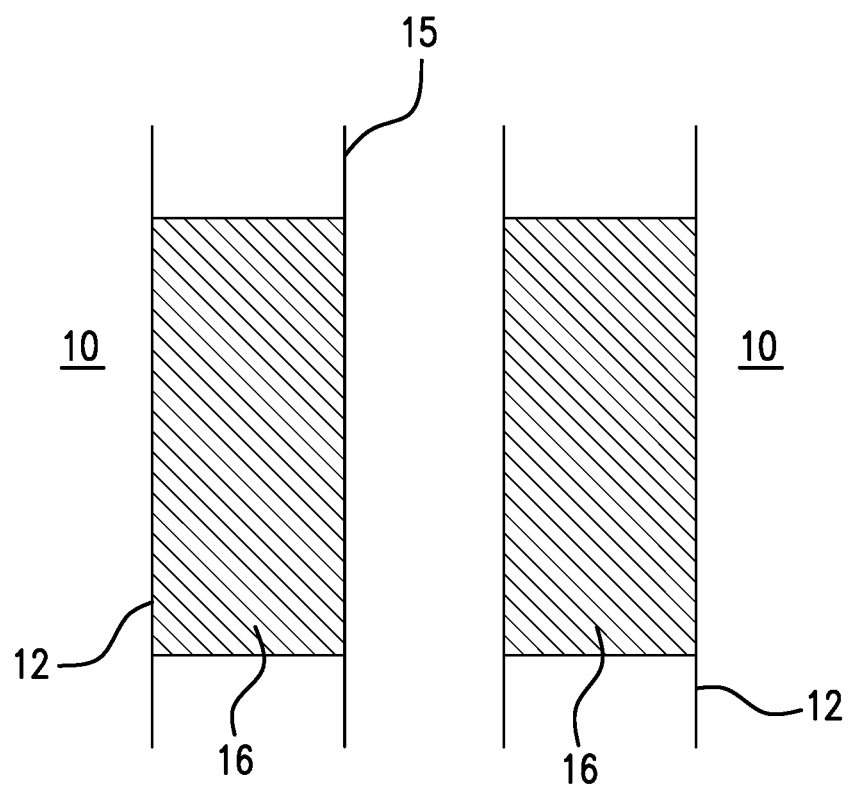
FIG. 3 is the schematic illustration of the device shown in FIG. 2 after the filter cake is exposed to the fluid system for an additional period of time to remove the filter cake.

An efficient method of installing a downhole article comprising a shape-memory polymer is disclosed. Referring to FIGS. 1-3, the method includes disposing a device into a borehole in proximity to a subterranean formation (10) where a filter cake (18) has been formed adjacent thereto, the device comprising a support structure (15) and a shape-memory article (16) disposed at the support structure, the shape-memory article comprising a shape-memory polymer, wherein the device is disposed when the shape-memory article is in a compacted shape; exposing the shape-memory article to a fluid system to cause the shape-memory article to expand and conform to a surface of a borehole; exposing the filter cake to the fluid system; and removing the filter cake with the fluid system. The support structure can be a tubular member such as a perforated base pipe. As illustrated in these figures, filter cake (18) is removed after the shape-memory article (16) has expanded and conformed to a surface of the borehole.

The shape-memory articles are run into the wellbore in a deformed shape or position. Deformed shape-memory articles can be made by compressing or stretching the shape-memory polymers with a mechanical force at a temperature greater than the glass transition temperature of the polymer. While still in the deformed state, the material is cooled down to a temperature below its glass transition temperature. The shape-memory polymers remain in the deformed shape induced on it after manufacture at surface temperature or at wellbore temperature during run-in. After the downhole article comprising the shape-memory polymer is placed at the desired location within the well, it is contacted with a fluid system as described herein. The fluid system reduces the glass transition temperature of the shape-memory polymer and/or reduces the rigidity of the polymer thus facilitating the deployment of the shape-memory article.

In an embodiment, the shape-memory article is deployed to conform to a surface of the borehole. In other words, the shape-memory article expands or deploys to fill the available space up to the borehole wall. The borehole wall will limit the final, recovered shape of the shape-memory article and not permit it to expand to its original, geometric shape. In this way, the recovered or deployed shape-memory article will perform the desired function within the wellbore.

In some embodiment, while introducing the shape-memory article downhole, the article is contacted with a first fluid comprising water, brine, hydrocarbon, or a combination comprising at least one of the foregoing. If the shape-memory article absorbs the first fluid, it is preferably to inject the fluid systems at a sufficient pressure to displace the first fluid in the shape-memory polymer with the fluid systems.

When the shape-memory article is a polymer foam, as a result of the shape memory polymer being expanded to its set position, the open cell porous shape memory foam can prevent production of undesirable solids from the formation and allow only desired hydrocarbon fluids to flow through the shape memory foam. The foam cell pore size, size distribution and cell openness may be adjusted by formulating different components and by controlling processing conditions in such a way that only desired hydrocarbon fluids are allowed to flow through and undesirable solids from the formation are prevented from being produced.

Alternatively, the shape memory polymer may be designed to prevent fluids as well as solids from passing therethrough, in which case the tool is a packer or other isolation device. Thus, suitable downhole devices used in the methods described herein include an expansion tool, a screen, a packer, and an isolation plug.

The following is a description of examples of fluid systems that can be used to deploy shape-memory polymers and to remove filter cakes. It is noted that the components of the fluid systems and the amounts thereof are not limited to the specific examples.

EXAMPLES

Various fluid systems were prepared by combining, if used, acetic acid as the acid component or an acid precursor, trisodium N-hydroxyethylethylenediaminetriacetate (chelating agent 1) or (N,N-dicarboxymethyl glutamic) acid (chelating agent 2) as the chelating agent, butanol (activator 1), butoxy tri-glycol (activator 2), or acetyl acetone (activator 3) as the activator, cellulose as the viscosifier, brine, DFE 734 (surfactant 1) or OHR 1631 (surfactant 2) as the surfactant, and OHR AC as the corrosion inhibitor. The amounts of the components are shown in Tables 1-3.

The expansion rates of shape-memory polymers in the fluid systems were evaluated. GeoFORM HiTg coupons were made from a shape-memory polyurethane having a Tg ranging from 142-148° C. GeoFORM LoTg coupons were made from a shape-memory polyurethane having a Tg ranging from 98-105° C. The expansion rates were tested by exposing a compressed GeoFORM coupon of a known size to the fluid system to be tested. The jar with the fluid system and the GeoFORM coupon was placed in a pre-heated water bath at the desired temperature. The coupon was measured over time. Graphs of the height of the coupon (inch) as a function of time (hour) are shown in FIG. 4-FIG. 7.

The breakthrough time refers to the time at which the fluid system breaks through a filter cake and an aloxite disk. The breakthrough test started by building a filter cake by adding a drilling mud to a double-ended cell that contained a new mercury 40-micron disk. The cake was built at 132 or 172° F., under 500 psi constant pressure for four hours. After four hours, the cell was cooled down. The drilling fluid was decanted, and the fluid system to be tested was added to the cell. The cell then was placed back into a jacket, with an open bottom stem, to run the test at 132 or 172° F. under 200 psi constant pressure. The breakthrough time was captured by using a HTHP equipment and balances connected to a computer program (RSI program).

The flow back percent can be calculated via the following equation:

Flow back %=(Initial flow back=Average time recorded for 200 mL of a mineral oil to flow back with a clean disk)/(Final flow back=Average time recorded for 200 mL of a mineral oil to flow back after 24 hours soaking test)×100%. (Equation 1)

The test was initiated by assembling a 500 mL double-ended cell with a screen assembly, a GeoFORM coupon, if used, and a new mercury 40-micron aloxite disk. A mineral oil such as LVT-200 was pumped through the cell system at 5 psi and collected in production mode. The amount of time that took to collect 200 mL of the mineral oil was recorded. After repeating the collection three times, the average of the readings was calculated and the initial flow back time was obtained.

The cell was empty out of the mineral oil, and the screens and GeoFORM were removed. The fluid system was added to the cell, and the cell was soaked at 132 or 172° F. and a pressure of 200 psi for 24 hours. After cooling, the fluid system was removed from the cell. The screen stack assembly and GeoFORM coupon, if used, were placed in the cell on top of the aloxite disk. The cell assembly was closed again and a mineral oil such as LVT-200 was pumped through the cell system at 5 psi and collected in production mode. The amount of time that took to collect 200 mL of the mineral oil was recorded. After repeating the collection three times, the average of the readings and the final flow back the time were calculated. The flow back percent was calculated according to equation 1.

TABLE 1

| Component | Unit | CEx 1 | Ex 2 |
|---|---|---|---|
| Brine | ppg | 10 | 10 |
| Surfactant 1 | wt % | 20 | 20 |
| Acid component | wt % | 10 | 10 |

TABLE 1-continued

| Component | Unit | CEx 1 | Ex 2 |
|---|---|---|---|
| Activator 1 | wt % | 5 | 5 |
| Viscosifier | wt % | 0 | 2.4 |
| Property | | | |
| Breakthrough Time (172° F.) | Hour | 7 | 22-24 |

The data in Table 1 shows that without viscosifier, the filter cake was broken in about 7 hours, which is too fast because shape-memory polymers need more than 7 hours to deploy when exposed to the tested fluid systems. With a small amount of viscosifier such as 2.4 wt % of a viscosifier added, the filter cake was broken in about 22-24 hours, which provides sufficient time for the shape-memory polymers to fully expand.

TABLE 2

| Component | Unit | CEx 3 | Ex 4 | Ex 5 | Ex 6 | Ex7 | Ex 8 | CEx 9 |
|---|---|---|---|---|---|---|---|---|
| Brine (CaBr$_2$) | ppg | 10 | 10 | 10 | 10 | | | |
| Brine (NaCl) | ppg | | | | | 9 | 9 | 9 |
| Surfactant 1 | wt % | 20 | 20 | 20 | 20 | 25 | 25 | |
| Surfactant 2 | wt % | | | | | | | 25 |
| Acetic Acid | wt % | 10 | 10 | 10 | 10 | 10 | | 10 |
| Acid precursor | | | | | | | 15 | |
| Activator 1 | wt % | 5 | 5 | 5 | 5 | 5 | 5 | |
| Viscosifier | wt % | 0 | 1.2 | 2.5 | 2.4 | 1.2 | 1.2 | 0 |

Figure 4:
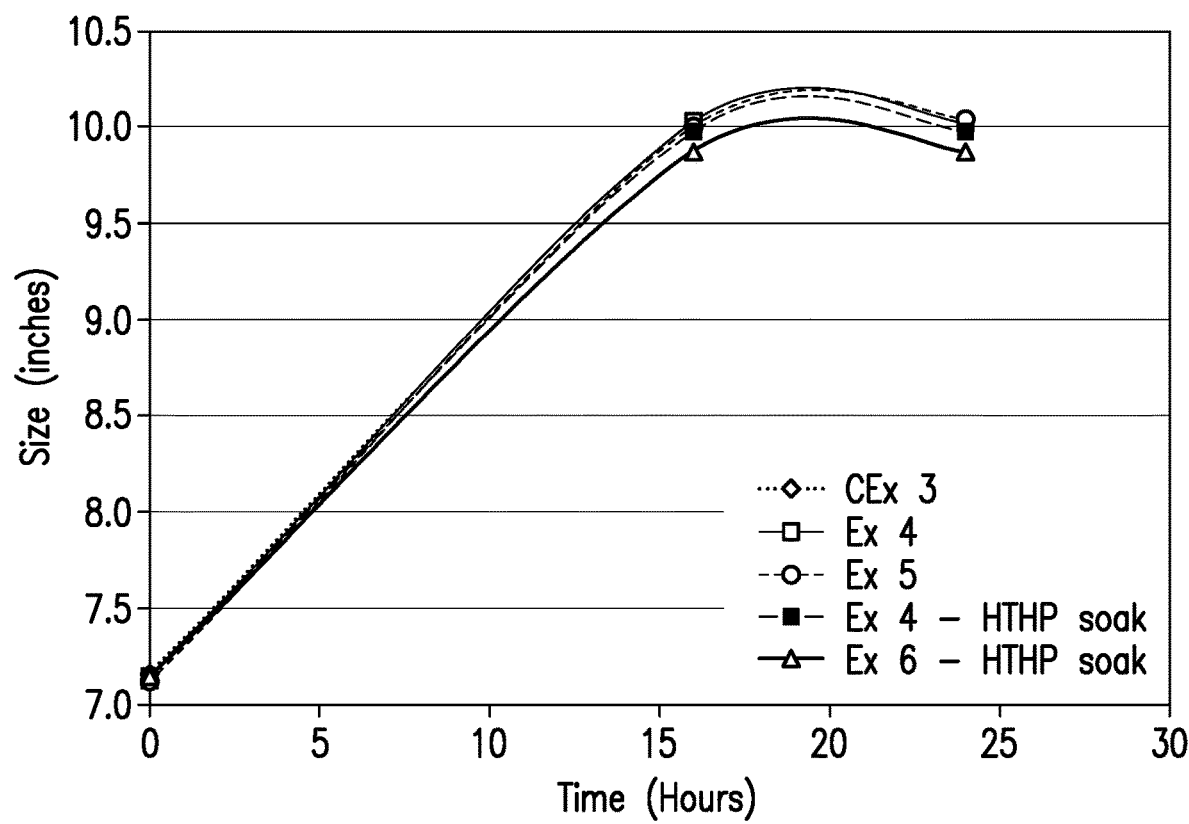
FIG. 4 is a graph of the height of a shape-memory coupon HiTg GeoFORM (inch) as a function of time (hour) when the coupon is exposed to the fluid systems of Examples 3-6 at 172° F.
Figure 5:
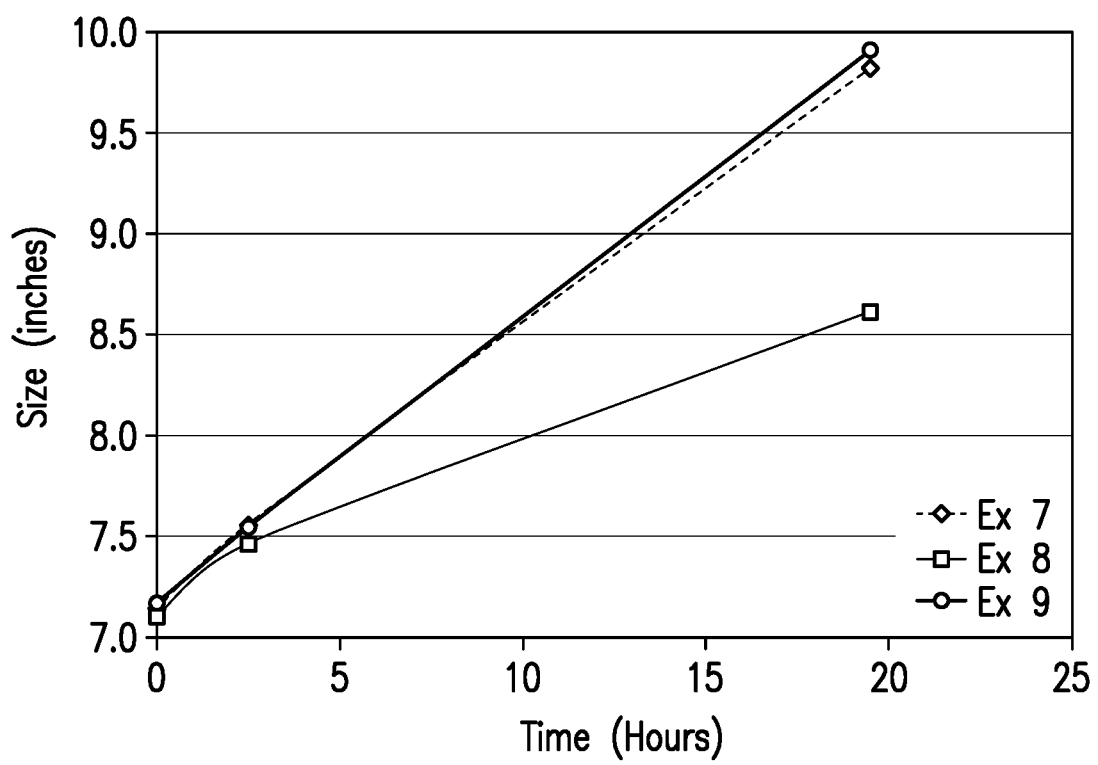
FIG. 5 is a graph of the height of a shape-memory coupon HiTg GeoFORM (inch) as a function of time (hour) when the coupon is exposed to the fluid systems of Examples 7-9 at 172° F.

Table 2 shows fluid systems with and without viscosifier. Different brine, surfactant, and acid component were used. FIGS. 4 and 5 are graphs of the height of a shape-memory polymer coupon HiTg GeoFORM (inch) as a function of time (hour) when the coupon is exposed to the fluid systems of examples 3-9 at 172° F. The results indicate that GeoFORM was expanded with viscosified fluid system regardless of type of the brine or surfactant. The presence or amount of the viscosifier does not affect the expansion time of GeoFORM.

TABLE 3

| Component | Unit | Ex 10 | Ex 11 |
|---|---|---|---|
| Brine | ppg | 10 | 10 |
| Surfactant 1 | wt % | 23-25 | 20 |
| Acid component | wt % | 10 | 10 |
| Activator 1 | wt % | 5 | 5 |
| Corrosion inhibitor | wt % | 1-3 | 1-3 |
| Viscosifier | wt % | 0.5-1 | 1-2 |
| Property | | | |
| GeoFORM coupon | | LoTg | HiTg |
| Test Temperature | ° F. | 132 | 172 |
| GeoFORM expansion time | Hour | 12-16 | 8-16 |
| Breakthrough Time | Hour | 24-25 | 16-43 |
| Flow back percentage | % | 92-100 | 92-100 |
| Flow back with GeoFORM | % | 97-100 | 69-100 |

Table 3 shows that by using the fluid systems as described in the disclosure, shape-memory polymers can be deployed before the filter cake is removed. In addition, a flow back percent of greater than 90% can be achieved in most circumstances.

Figure 6:
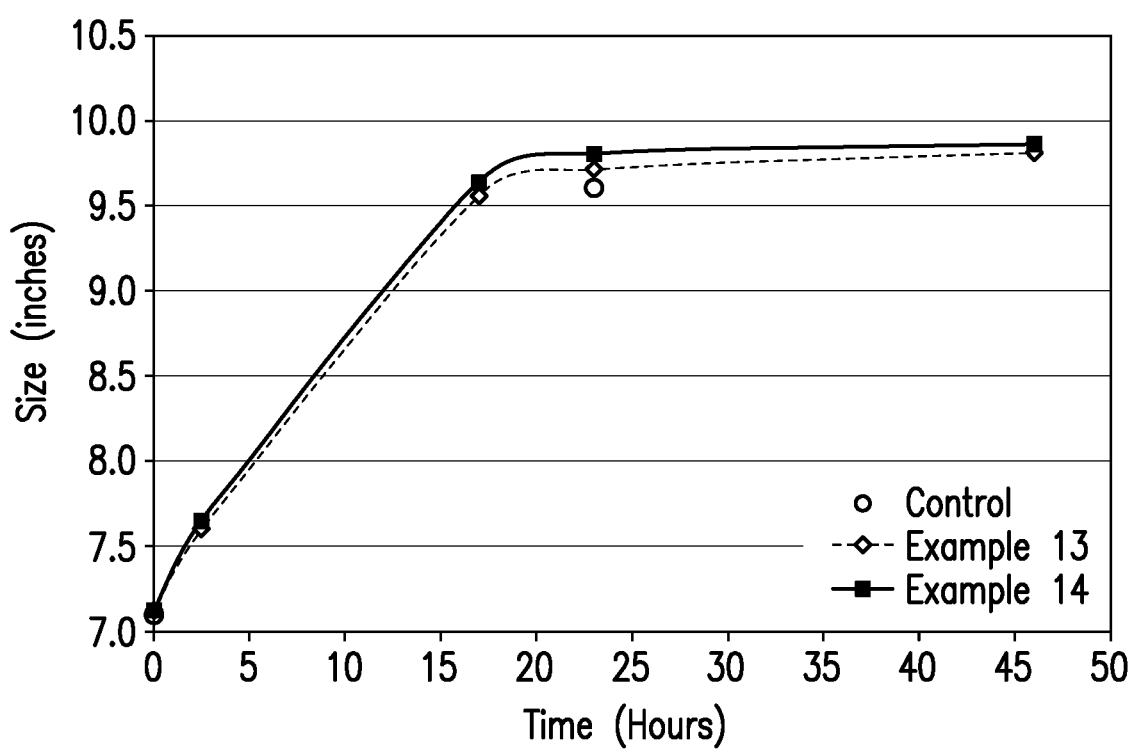
FIG. 6 is a graph of the height of a shape-memory coupon HiTg GeoFORM (inch) as a function of time (hour) when the coupon is exposed to the fluid systems of Examples 13 and 14 at 180° F.

A fluid system of Example 12 contains 10 ppg of a brine, 5 wt % of activator 1, 20 wt % of surfactant 1, 16% chelating agent 1, and 1 wt % of corrosion inhibitor. A fluid system of Example 13 contains 10 ppg of a brine, 5 wt % of activator 1, 20 wt % surfactant 1, 8% chelating agent 2, and 1 wt % of corrosion inhibitor. FIG. 6 is a graph of the height of a shape-memory polymer coupon HiTg GeoFORM (inch) as a function of time (hour) when the coupon is exposed to the fluid systems of Examples 12 and 13 at 180° F. A control sample was exposed to 10 ppg sodium chloride at 212° F. for 24 hours. The results indicate that GeoFORM was expanded with fluid systems containing a chelating agent instead of an acid component.

Figure 7:
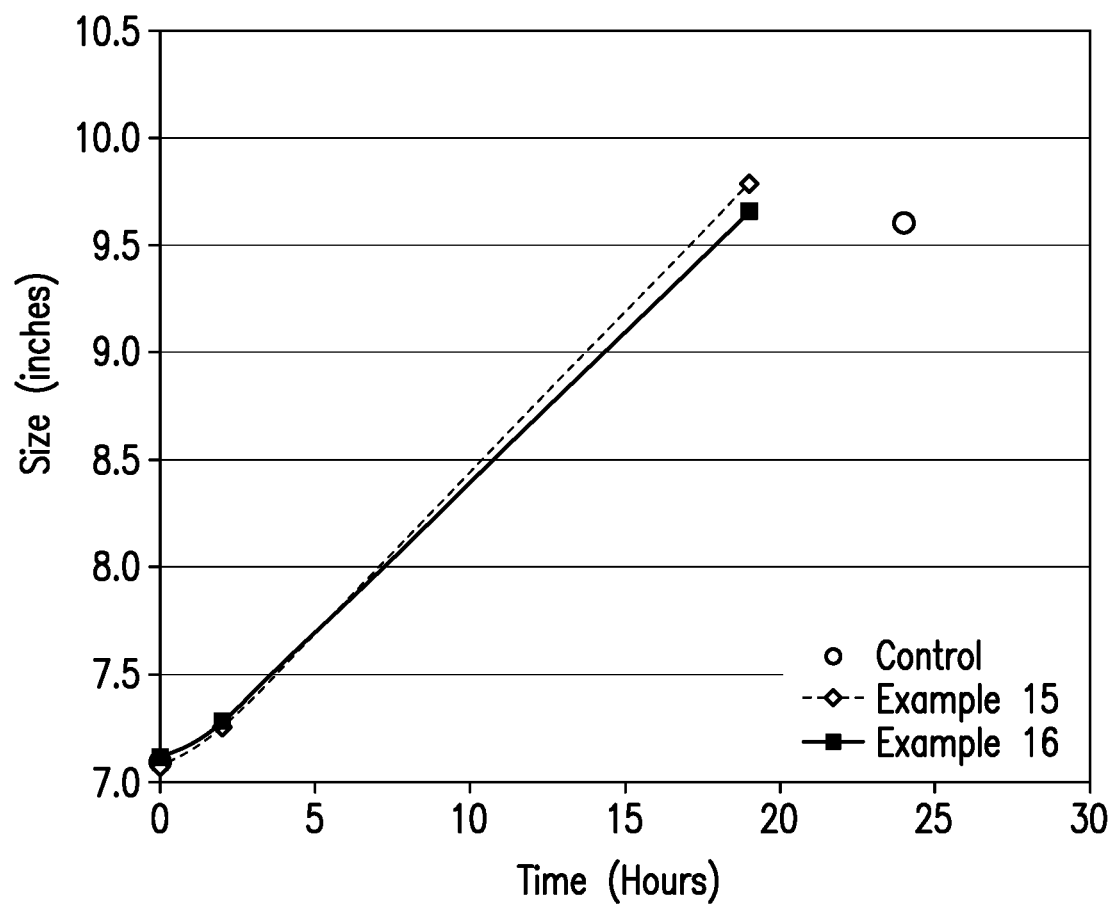
FIG. 7 is a graph of the height of a shape-memory coupon HiTg GeoFORM (inch) as a function of time (hour) when the coupon is exposed to the fluid systems of Examples 15 and 16 at 180° F.

A fluid system of Example 14 contains 10 ppg of a brine, 8 wt % of activator 2, 20 wt % of surfactant 1, 8% acetic acid, and 1 wt % of corrosion inhibitor. A fluid system of Example 15 contains 10 ppg of a brine, 5 wt % of activator 2, 20 wt % surfactant 1, 8 wt % of acetic acid, and 1 wt % of corrosion inhibitor. FIG. 7 is a graph of the height of a shape-memory polymer coupon HiTg GeoFORM (inch) as a function of time (hour) when the coupon is exposed to the fluid systems of Examples 14 and 15 at 180° F. A control sample was exposed to 10 ppg sodium chloride at 212° F. for 24 hours. The results indicate that GeoFORM was expanded with fluid systems containing butoxy tri-glycol as the activator.

Tables 4 and 5 summarize the breakthrough properties of fluid systems with different activators and/or chelating agents.

TABLE 4

| Component | Unit | Ex 16 | Ex 17 | Ex 18 | Ex 19 |
|---|---|---|---|---|---|
| Brine | ppg | 10 | 10 | 10 | 10 |
| Surfactant 1 | wt % | 20 | 20 | 20 | 20 |
| Acid component | wt % | 8 | 8 | 8 | 10 |
| Activator 1 | wt % | | | 5 | |
| Activator 2 | wt % | 5 | | | 5 |
| Activator 3 | wt % | | 8 | | |
| Corrosion inhibitor | wt % | 1 | 1 | 1 | 1 |
| Viscosifier | wt % | 1 | 1 | 1 | 1 |
| Property | | | | | |
| Breakthrough Time | Hour | 11 | >24 | 24 | 12 |
| Flow back % | % | 69 | 87 | >95 | 77 |

TABLE 5

| Component | Unit | Ex 20 | Ex 21 | Ex 22 | Ex 23 | Ex 24 |
|---|---|---|---|---|---|---|
| Brine | ppg | 10 | 10 | 10 | 10 | 10 |
| Surfactant 1 | wt % | 20 | 20 | 20 | 20 | 20 |
| Acid component | | | | 5 | | |
| Chelating agent 1 | wt % | 16 | 16 | 30 | | |
| Chelating agent 2 | wt % | | | | 8 | 8 |
| Activator 1 | wt % | | 5 | | | 5 |
| Activator 2 | wt % | 5 | | 5 | 5 | |
| Activator 3 | | | | | | |
| Corrosion inhibitor | wt % | 1 | 1 | 1 | 1 | 1 |
| Viscosifier | wt % | 1 | 1 | 1 | 1 | 1 |
| Property | | | | | | |
| Breakthrough Time | Hour | >24 | >24 | 10 | 12.5 | >24 |
| Flow back % | % | 66 | 72 | 54 | 46 | 56 |

Set forth below are various embodiments of the disclosure.

Embodiment 1. A method comprising: disposing a device into a borehole in proximity to a subterranean formation where a filter cake has been formed adjacent thereto, the device comprising a support structure and a shape-memory article disposed at the support structure, the shape-memory article comprising a shape-memory polymer, wherein the device is disposed when the shape-memory article is in a compacted shape; exposing the shape-memory article to a fluid system to cause the shape-memory article to expand and conform to a surface of the borehole; exposing the filter cake to the fluid system; and removing the filter cake with the fluid system; wherein the fluid system comprises (i) an acid component, a chelating agent, or a combination thereof; (ii) an activator, (iii) a viscosifier, (iv) water or a brine, and (v) optionally a surfactant.

Embodiment 2. The method as in any prior embodiment, wherein the filter cake is removed after the shape-memory article has expanded and conformed to the surface of the borehole.

Embodiment 3. The method as in any prior embodiment, wherein the filter cake is removed at least two hours after the shape-memory article has expanded and conformed to the surface of the borehole.

Embodiment 4. The method as in any prior embodiment, wherein the fluid system comprises, based on the total weight of the fluid system: (i) about 1 to 25 wt % of the acid component, or about 5 to 30 wt % of the chelating agent, or a combination thereof; (ii) about 1 to 20 wt % of the activator; (iii) about 0.1 to 3 wt % of the viscosifier; and (iv) about 30 to 90 wt % of the water or brine.

Embodiment 5. The method as in any prior embodiment, where the fluid system comprises about 5 to 30 wt % of the surfactant based on the total weight of the fluid system, the surfactant comprising at least a non-ionic surfactant, an anionic surfactant, a cationic surfactant, or an amphoteric surfactant.

Embodiment 6. The method as in any prior embodiment, wherein the nonionic surfactant comprises at least one of an alkyl polyglycoside, a sorbitan ester, a polyglycol ester, a methyl glucoside ester, an alcohol ethoxylate, or surfactin; the anionic surfactant comprises at least one of an alkali metal alkyl sulfate, an alkyl or alkylaryl sulfonate, a linear or branched alkyl ether sulfate, a linear or branched alkyl ether sulfonate, an alcohol polypropoxylated and/or polyethoxylated sulfate, an alcohol polypropoxylated and/or polyethoxylated carboxylate, an alkyl or alkylaryl disulfonate, an alkyl disulfate, a sulfobetaine, an alkyl sulphosuccinate, an alkyl ether sulfate, or a linear and branched ether sulfate; and the cationic surfactant comprises at least one of a quaternary ammonium compound, an arginine methyl ester, an alkanolamine, or an alkylenediamines.

Embodiment 7. The method as in any prior embodiment, wherein the acid component comprises at least one of acetic acid, formic acid, lactic acid, citric acid, phthalic acid, an amino acid, an ester thereof, or an inorganic acid.

Embodiment 8. The method as in any prior embodiment, where the activator comprises at least one of butanol, butoxy tri-glycol, 2-butoxyethanol, acetyl acetone, adipate, maleate, a glutamic acid derivative, an ethoxylated alcohol, a proxylated alcohol, a glycol, an ethoxylated alcohol, an ethoxylated glycol, an ethoxylated phenol, a propoxylated alcohol, a propoxylated glycol, a propoxylated phenol, an ethoxylated and propoxylated alcohol, an ethoxylated and propoxylated glycol, an ethoxylated and propoxylated phenol, n-butyl acetate, n-butyl propionate, n-propyl propionate, n-pentyl propionate, diethylene glycol, mono ethyl ether acetate, or triethylene glycol n-butyl.

Embodiment 9. The method as in any prior embodiment, wherein the activator comprises butanol.

Embodiment 10. The method as in any prior embodiment, wherein the fluid system comprises the chelating agent, and the chelating agent comprises at least one of ethylenediaminetetraacetic acid (EDTA), trisodium N-(hydroxyethyl)-ethylenediaminetriacetate, pentasodium diethylene-triamine-pentaacetate, (N,N-dicarboxymethyl glutamic) acid, aspartic acid N,N-diacetic acid, methylglycine N,N-diacetic acid, N-hydroxyethyl ethylenediamine N,N',N'-triacetic acid, etidronic acid, diethylenetriamine pentaacetateor, N-(2-Hydroxyethyl)iminodiacetic acid, trisodium dicarboxymethyl alaninate, ethylenediamine-N,N'-disuccinic acid, egtazic acid, nitrilotriacetic acid, cyclohexanediaminetetraacetic acid, or a salt thereof.

Embodiment 11. The method as in any prior embodiment, where the viscosifier comprises at least one of a hydratable polysaccharide, xanthan gum, cellulose, a cellulose derivative, a viscoelastic surfactant, a polyacrylamide, a polyacrylate, or diallyldimethylammonium chloride.

Embodiment 12. The method as in any prior embodiment, where the fluid system comprises the brine, which comprises at least a halide or formate salt of Ca, Na, K, Cs, or Zn.

Embodiment 13. The method as in any prior embodiment, where the fluid system further comprises about 1 to 3 wt % of a corrosion inhibitor.

Embodiment 14. The method as in any prior embodiment, wherein the fluid system comprises, based on the total weight of the fluid system, (i) about 1 to 25 wt. % of the acid component, or about 3 to 30 wt. % of the chelating agent, or a combination thereof (ii) about 1 to 20 wt. % of the activator; (iii) about 0.1 to 3 wt. % of the viscosifier; (iv) about 30 to 90 wt. % of the brine; (v) about 5 to 30 wt. % of a surfactant; (vi) about 1 to 20 wt. % of a co-solvent; and (vii) about 1 to 3 wt. % of a corrosion inhibitor.

Embodiment 15. The method as in any prior embodiment, wherein the acid component comprises at least one of acetic acid or formic acid; the activator comprises at least one of butanol or butoxy tri-glycol; the chelating agent comprises at least one of trisodium N-(hydroxyethyl)-ethylenediaminetriacetate, or (N,N-dicarboxymethyl glutamic) acid; and the viscosifier comprises at least one of cellulose, hydroxyethylcellulose, carboxymethylcellulose, hydroxypropylcellulose, or carboxy methylhydroxyethylcellulose.

Embodiment 16. The method as in any prior embodiment, wherein the shape-memory polymer comprises at least one of a polyurethane; polyamide; polyurea; polyvinyl alcohol; vinyl alcohol-vinyl ester copolymer; phenolic polymer; polybenzimidazole; polyethylene oxide/acrylic acid/methacrylic acid copolymer crosslinked with N,N'-methylenebis-acrylamide; polyethylene oxide/methacrylic acid/N-vinyl-2-pyrrolidone copolymer crosslinked with ethylene glycol dimethacrylate; or polyethylene oxide/poly(methyl methacrylate)/N-vinyl-2-pyrrolidone copolymer crosslinked with ethylene glycol dimethacrylate.

Embodiment 17. The method as in any prior embodiment, wherein the shape-memory article has a porous structure, and the method further comprises flowing a fluid through the shape-memory article.

Embodiment 18. A fluid system comprising, based on the total weight of the fluid system, (i) about 1 to 25 wt. % of an acid component, or about 3 to 30 wt. % of a chelating agent, or a combination thereof (ii) about 1 to 20 wt. % of an activator; (iii) about 0.1 to 3 wt. % of a viscosifier; (iv) about 30 to 90 wt. % of a brine; (v) about 5 to 30 wt. % of a surfactant; (vi) about 1 to 20 wt. % of a co-solvent; and (vii) about 1 to 3 wt. % of a corrosion inhibitor.

Embodiment 19. The fluid system as in any prior embodiment, wherein the acid component comprises at least one of acetic acid, formic acid, lactic acid, citric acid, or an ester thereof.

Embodiment 20. The fluid system of claim 18, wherein the activator comprises at least one of butanol, butoxy tri-glycols, 2-butoxyethanol, acetyl acetone, adipate, maleate, or a glutamic acid derivative; the chelating agent comprises at least one of sodium ethyl ethylenediaminetetraacetic acid, disodium ethylenediaminetetraacetic acid, trisodium N-(hydroxyethyl)-ethylenediaminetriacetate, pentasodium diethylene-triaminepentaacetate, GDLA, or (N,N-dicarboxymethyl glutamic) acid; and the viscosifier comprises at least one of a xanthan gum polysaccharide, a viscoelastic surfactant, a hydroxylethyl cellulose, a polyacrylamides, or a diallyldimethylammonium chloride polymer.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity). As used herein, the size or average size of the particles refers to the largest dimension of the particles and can be determined by high resolution electron or atomic force microscope technology.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method comprising:
   disposing a device into a borehole in proximity to a subterranean formation where a filter cake has been formed adjacent thereto, the device comprising a support structure and a shape-memory article disposed at the support structure, the shape-memory article comprising a shape-memory polymer, wherein the device is disposed when the shape-memory article is in a compacted shape;
   exposing the shape-memory article to a fluid system to cause the shape-memory article to expand and conform to a surface of the filter cake;
   exposing the filter cake to the fluid system; and
   removing the filter cake with the fluid system to cause the shape-memory article to conform to a surface of the borehole;
   wherein the fluid system comprises (i) an acid component; (ii) an activator, (iii) a viscosifier, (iv) water or a brine, and (v) a surfactant.

2. The method of claim 1, wherein the filter cake is removed after the shape-memory article has expanded and conformed to the surface of the filter cake.

3. The method of claim 2, wherein the filter cake is removed at least two hours after the shape-memory article has expanded and conformed to the surface of the filter cake.

4. The method of claim 1, wherein the fluid system comprises, based on the total weight of the fluid system:
   (i) about 1 to 25 wt % of the acid component;
   (ii) about 1 to 20 wt % of the activator;
   (iii) about 0.1 to 3 wt % of the viscosifier;
   (iv) about 30 to 90 wt % of the water or brine; and
   (v) about 5 to about 30 wt % of the surfactant.

5. The method of claim 1, wherein the surfactant comprises a non-ionic surfactant.

6. The method of claim 5, wherein the nonionic surfactant comprises at least one of an alkyl polyglycoside, a sorbitan ester, a polyglycol ester, a methyl glucoside ester, an alcohol ethoxylate, or surfactin.

7. The method of claim 1, wherein the acid component comprises at least one of acetic acid, formic acid, lactic acid, citric acid, phthalic acid, an amino acid, an ester thereof, or an inorganic acid.

8. The method of claim 1, where the activator comprises at least one of butanol, butoxy tri-glycol, 2-butoxyethanol, acetyl acetone, adipate, maleate, a glutamic acid derivative, an ethoxylated alcohol, a propoxylated alcohol, a glycol, an ethoxylated alcohol, an ethoxylated glycol, an ethoxylated phenol, a propoxylated alcohol, a propoxylated glycol, a propoxylated phenol, an ethoxylated and propoxylated alcohol, an ethoxylated and propoxylated glycol, an ethoxylated and propoxylated phenol, n-butyl acetate, n-butyl propionate, n-propyl propionate, n-pentyl propionate, diethylene glycol, mono ethyl ether acetate, or triethylene glycol n-butyl.

9. The method of claim 1, wherein the activator comprises butanol.

10. The method of claim 1, wherein the fluid system further comprises a chelating agent, and the chelating agent comprises at least one of ethylenediaminetetraacetic acid (EDTA), tri sodium N-(hydroxyethyl)-ethylenediaminetriacetate, pentasodium di ethylene-triaminepentaacetate, (N,N-dicarboxymethyl glutamic) acid, aspartic acid N,N-diacetic acid, methylglycine N,N-diacetic acid, N-hydroxyethyl ethylenediamine N,N',N'-triacetic acid, etidronic acid, diethylenetriamine pentaacetateor, N-(2-Hydroxyethyl)iminodiacetic acid, trisodium dicarboxymethyl alaninate, ethylenediamine-N,N'-disuccinic acid, egtazic acid, nitrilotriacetic acid, cyclohexanediaminetetraacetic acid, or a salt thereof.

11. The method of claim 1, where the viscosifier comprises at least one of a hydratable polysaccharide, xanthan gum, cellulose, a cellulose derivative, a viscoelastic surfactant, a polyacrylamide, a polyacrylate, or diallyldimethylammonium chloride.

12. The method of claim 1, where the fluid system comprises the brine, which comprises at least a halide or formate salt of Ca, Na, K, Cs, or Zn.

13. The method of claim 1, where the fluid system further comprises about 1 to 3 wt % of a corrosion inhibitor.

14. The method of claim 1, wherein the fluid system comprises, based on the total weight of the fluid system,
   (i) about 1 to 25 wt. % of the acid component;
   (ii) about 1 to 20 wt. % of the activator;
   (iii) about 0.1 to 3 wt. % of the viscosifier;
   (iv) about 30 to 90 wt. % of the brine;
   (v) about 5 to 30 wt. % of the surfactant;
   (vi) about 1 to 20 wt. % of a co-solvent; and
   (vii) about 1 to 3 wt. % of a corrosion inhibitor.

15. The method of claim 14, wherein the acid component comprises at least one of acetic acid or formic acid;
   the activator comprises at least one of butanol or butoxy tri-glycol; and
   the viscosifier comprises at least one of cellulose, hydroxyethylcellulose, carboxymethylcellulose, hydroxypropylcellulose, or carboxymethylhydroxyethylcellulose.

16. The method of claim 1, wherein the shape-memory polymer comprises at least one of a polyurethane; polyamide; polyurea; polyvinyl alcohol; vinyl alcohol-vinyl ester copolymer; phenolic polymer; polybenzimidazole; polyethylene oxide/acrylic acid/methacrylic acid copolymer crosslinked with N,N'-methylene-bis-acrylamide; polyethylene oxide/methacrylic acid/N-vinyl-2-pyrrolidone copolymer crosslinked with ethylene glycol dimethacrylate; or polyethylene oxide/poly(methyl methacrylate)/N-vinyl-2-pyrrolidone copolymer crosslinked with ethylene glycol dimethacrylate.

17. The method of claim 1, wherein the shape-memory article has a porous structure, and the method further comprises flowing a fluid through the shape-memory article.

18. The method of claim 1, wherein the surfactant comprises an anionic surfactant.

19. The method of claim 18, wherein
the anionic surfactant comprises at least one of an alkali metal alkyl sulfate, an alkyl or alkylaryl sulfonate, a linear or branched alkyl ether sulfate, a linear or branched alkyl ether sulfonate, an alcohol polypropoxylated and/or polyethoxylated sulfate, an alcohol polypropoxylated and/or polyethoxylated carboxylate, an alkyl or alkylaryl disulfonate, an alkyl disulfate, a sulfobetaine, an alkyl sulphosuccinate, an alkyl ether sulfate, or a linear and branched ether sulfate.

20. The method of claim 1, wherein the surfactant comprises a cationic surfactant.

21. The method of claim 20, wherein the cationic surfactant comprises at least one of a quaternary ammonium compound, an arginine methyl ester, an alkanolamine, or an alkylenediamine.

22. The method of claim 1, wherein the surfactant comprises an amphoteric surfactant.

* * * * *